Oct. 28, 1930.                L. C. POCOCK                1,779,490
                            TELEPHONE HANDSET
                           Filed Dec. 12, 1928
FIG. 1
FIG. 2
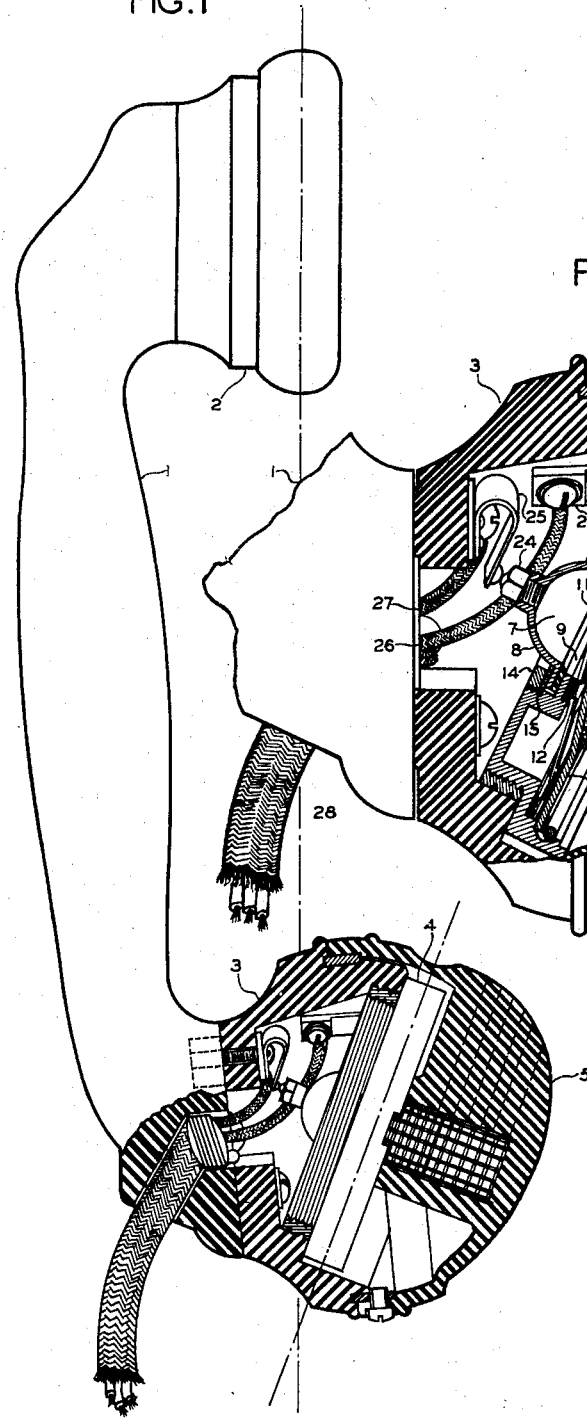
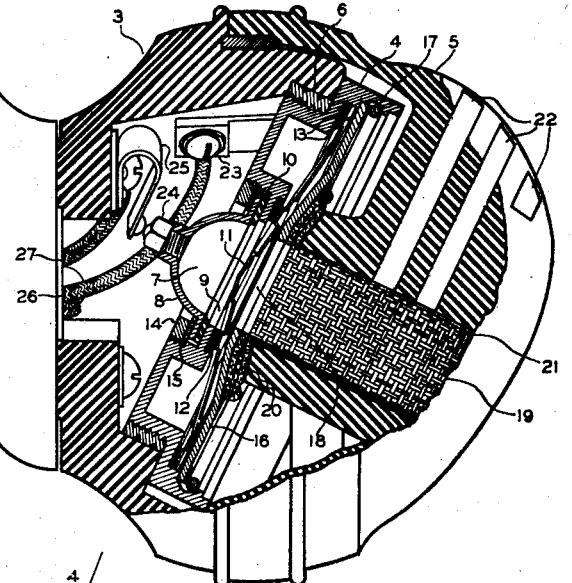
LYNDALL C. POCOCK
INVENTOR
BY  *F. Hutchinson*
ATTORNEY Patented Oct. 28, 1930

1,779,490

UNITED STATES PATENT OFFICE

LYNDALL CROSSTHWAITE POCOCK, OF ALDWYCH, LONDON, ENGLAND, ASSIGNOR TO INTERNATIONAL STANDARD ELECTRIC CORPORATION, OF NEW YORK, N. Y.

TELEPHONE HAND SET

Application filed December 12, 1928, Serial No. 325,614, and in Great Britain October 31, 1927.

This invention relates to improvements in telephone hand sets of the kind comprising a transmitter and a receiver secured respectively to the ends of a handle in such a manner that the receiver can be held to the ear while the mouthpiece of the transmitter is convenient to the mouth of the user, the transmitter being of the granule type.

In order to obtain maximum efficiency of transmitters of this type it is necessary for the granules to remain in contact with the transmitter diaphragm or equivalent granule driving member and also with the electrodes throughout the range of angular positions in which the hand set may be held while in use.

In the usual forms of telephone hand set the transmitter diaphragm is either placed in a plane parallel to the plane of the receiver earcap or in a plane which intersects the plane of the receiver earcap at a point between the transmitter and receiver or at a point on that side of the receiver remote from the transmitter. It will be seen therefore that as the granule chamber is behind or below the diaphragm as the case may be the granules will not be in good contact with the diaphragm or driving member or adjacent electrode when the hand set is held in certain extreme tilted positions with the diaphragm upwards.

Attempts have been made to overcome the difficulty by arranging the granule chamber in front of the diaphragm but this arrangement has the disadvantage that the granules fall away from the diaphragm and adjacent electrode when the hand set is in the face down position as when resting on a cradle support, which tends to promote burning at the moment when the set is removed from the cradle thereby shortening the life of the transmitter. Another proposal to overcome the difficulty has been to incline the granule chamber, with the diaphragm or granule driving member above it, in a plane which intersects the plane of the receiver earcap on the side of the transmitter remote from the receiver, the said inclined granule driving member being obliquely coupled to the main transmitter diaphragm which lies in a plane at right angles to the plane of the receiver earcap.

The present invention has for its main object to provide an improved hand set transmitter in which the defects inherent in the above-mentioned arrangements are largely overcome and a transmitter of very pronounced efficiency is produced.

According to a feature of the invention the transmitter diaphragm or equivalent granule driving member is located beneath the granule chamber at a suitable angle to ensure adequate contact of the granules with it throughout a wide range of angular positions which the handset may assume in use.

Another aspect of the invention is that the said diaphragm or the like having the granule chamber above it is inclined at such an angle when the hand set is in either of its normal positions, namely vertical or horizontal, (as on a cradle), that the granules tend by gravity to remain in contact with the said diaphragm and the adjacent electrode.

Still another aspect of the invention is that the diaphragm of the transmitter is inclined to face away from the mouth of the user in such a manner that sound waves from the mouth of the user are deflected through more than 90° and less than 180° before impinging on the diaphragm.

The invention also includes various constructional features of the transmitter and hand set incidental to the above arrangement.

The particular embodiments of the invention will now be described with reference to the accompanying drawings in which Fig. 1 is a diagram illustrating a complete hand set embodying the invention and Fig. 2 is an enlarged sectional view of the transmitter and mouthpiece.

As shown in Fig. 1 the hand set is of conventional form comprising a handle (1) to one end of which is secured a receiver casing (2) and to the other end the transmitter casing (3). In the transmitter casing is secured the transmitter capsule (4) in a downwardly inclined position as shown, whereby the plane of the diaphragm intersects the plane of the receiver at a point on the side of the transmitter remote from the receiver as indicated in dotted lines. The mouthpiece (5) is of special construction and is of the slotted type.

The transmitter and mouthpiece construction will now be described in detail with reference to Fig. 2. The transmitter casing (3) which is of moulded construction has secured in it in an inclined position a metal screw threaded ring (6) into which the transmitter capsule casing (4) is screwed. The transmitter is of the barrier button type and the granule chamber (7) thereof is constituted by a hemi-spherical back electrode (8) which is separated from the front electrode (9) by the insulating barrier ring (10), the granule chamber being closed at the front by the movable diaphram (11) and the paper rings (12). This diaphragm is supported at its periphery to float between the paper rings (13).

A feature of the construction of the transmitter is that the front electrode (9) is manufactured in one piece with the capsule casing (4), the back electrode being secured in the casing by a retaining ring (14) bearing against an insualting washer (15) between the ring and the flange of the back electrode. The diaphragm is slightly conical in form and is of light metal construction which is ribbed radially to give it rigidity.

In front of the diaphragm there is arranged a metal closure plate (16) which is secured in the casing (4) by means of a spring retaining ring (17), this plate having a central hole (18) opposite the centre of the diaphragm. The mouthpiece (5) which is constituted by a substantially solid dome shaped moulding has a sound passage (19) which registers with the said hole (18), the joint being sealed by felt or like washers (20) associated with a gauze lining (21) within the sound passage (19). Slots (22) communicate with the aforesaid sound passage (19) so that sound waves are conveyed from the mouth of the user directly on to the diaphragm of the transmitter. The gauze lining effectively prevents the entry of particles finding their way into the slots (22) into the sound passage (19).

A terminal plate (23) is moulded in the casing (3) and forms an electrical connection with the screwed ring (6) which therefore constitutes a terminal for the front electrode (9) integral with the capsule casing (4) which is screwed into the said ring (6). The back electrode (8) has a screw filling cap (24) which makes electrical connection with the spring terminal strip (25) secured within the casing, flexible conductors (26) and (27) of the cord (28) being connected respectively to the said terminals.

It will be seen that with this inclined arrangement of transmitter and diaphragm the granules are maintained in effective engagement with the two electrodes (8) and (9) and with the central portion of the diaphragm (11) which forms the driving member of the transmitter, throughout a wide range of angular positions in which the handset will be held while in use, so that the chances of the transmitter being open circuited in practice are very remote. Moreover the constructional features of the transmitter and the method of mounting it rigidly in the casing with a sealed connection with the sound passage of the mouthpiece provide a very efficient acoustic arrangement.

It will be understood that while the invention has been described with reference to a transmitter in which the movable member or driving member of the transmitter is constituted by the main transmitter diaphragm, it is equally applicable to other types of transmitter wherein for instance the main transmitter diaphragm is coupled to a separate movable member associated with the granule chamber.

What is claimed is:

1. In a telephone handset, a handle-bar having a receiver at one end and a transmitter at its other end, the movable member of the transmitter being inclined to face away from the mouth of the user in such a manner that sound waves from the mouth of the user are deflected through more than 90° and less than 180° before impinging perpendicularly upon said movable member.

2. A telephone handset having a transmitter of the granule type comprising a granule chamber and a movable member co-operating therewith for producing pressure fluctuations on the granules, said movable member having the granule chamber above it and being inclined at such an angle when the handset is in either of its normal positions that the granules tend by gravity to remain in contact with said movable member.

3. A telephone handset as claimed in claim 2 in which the movable member with the granule chamber is arranged at a suitable angle to ensure adequate contact of the granules with said movable member throughout a wide range of angular positions which the handset may assume in use.

4. A telephone handset comprising a handle-bar having a receiver at one end and a transmitter at its other end, the diaphragm of said transmitter being located in a plane which intersects the plane of the receiver diaphragm on that side of the transmitter remote from the receiver, the granule chamber of the transmitter being on that side of the transmitter diaphragm nearest the receiver.

5. In a telephone handset in combination, a casing, a granular carbon transmitter secured within said casing in an inclined position so that the diaphragm thereof faces away from the mouth of the user in such a manner that sound waves issuing therefrom are deflected through more than 90° and less than 180° before impinging perpendicularly upon said diaphragm.

6. In a telephone handset in combination, a casing, a granular carbon transmitter secured within said casing in an inclined position so that the diaphragm thereof faces away from the mouth of the user in such a manner that sound waves issuing therefrom are deflected through more than 90° and less than 180° before impinging perpendicularly upon said diaphragm, and a mouthpiece having passages therein arranged to direct the sound waves on to said diaphragm.

7. In a telephone handset in combination, a casing, a granular carbon transmitter secured within said casing in an inclined position so that the diaphragm thereof faces away from the mouth of the user in such a manner that sound waves issuing therefrom are deflected through more than 90° and less than 180° before impinging perpendicularly upon said diaphragm, a mouthpiece having passages therein arranged to direct the sound waves on to said diaphragm, an apertured cover for said transmitter and means for making a sealed connection between one of said passages and said cover.

8. In a telephone handset in combination, a casing, a transmitter unit secured within said casing, a substantially solid dome-shaped mouthpiece secured to said casing and having within it a central passage directed towards the diaphragm of said transmitter unit, and further passages communicating with said central passage and the outer surface of said dome-shaped mouthpiece.

9. In a telephone handset in combination, a casing, a transmitter unit, secured within said casing, a substantially solid dome-shaped mouthpiece secured to said casing and having within it a central passage directed towards the diaphragm of said transmitter unit, and further passages communicating with said central passage and the outer surface of said dome-shaped mouthpiece, and a perforated lining within said central passage.

10. A telephone handset of moulded construction comprising a casing and means within said casing for rigidly securing a transmitter unit therein in a downwardly inclined position so that the diaphragm thereof faces away from the mouth of the user in such a manner that sound waves issuing therefrom are deflected through more than 90° and less than 180° before impinging perpendicularly upon said diaphragm.

11. A telephone handset of moulded construction comprising a casing, a transmitter unit rigidly secured within said casing in a downwardly inclined position, and a mouthpiece secured to said casing, said mouthpiece having sound passages therein arranged to direct sound waves to a main chamber perpendicular to the diaphragm of said transmitter unit.

12. In a telephone hand-set in combination, a casing, a transmitter unit secured within said casing, a substantially solid mouthpiece secured to said casing and having within it a central passage directed towards the diaphragm of said transmitter unit, and further passages communicating with said central passage and the outer surface of said mouthpiece.

13. In a telephone hand-set in combination, a casing, a transmitter unit secured within said casing, a substantially solid mouthpiece secured to said casing and having within it a central passage directed towards the diaphragm of said transmitter unit, and further passages communicating with said central passage and the outer surface of said mouthpiece, and a perforated lining within said central passage.

14. In a telephone hand-set in combination, a casing, a transmitter unit secured within said casing, a substantially solid mouthpiece secured to said casing and having within it a central passage directed towards the diaphragm of said transmitter unit, and a further passage communicating with said central passage and the outer surface of said mouthpiece.

15. In a telephone hand-set in combination, a casing, a transmitter unit secured within said casing, a mouthpiece secured to said casing, a central passage within said casing substantially perpendicular to the diaphragm of said transmitter unit, and an auxiliary passage communicating with said central passage.

LYNDALL CROSSTHWAITE POCOCK.